United States Patent Office 3,436,735
Patented Apr. 1, 1969

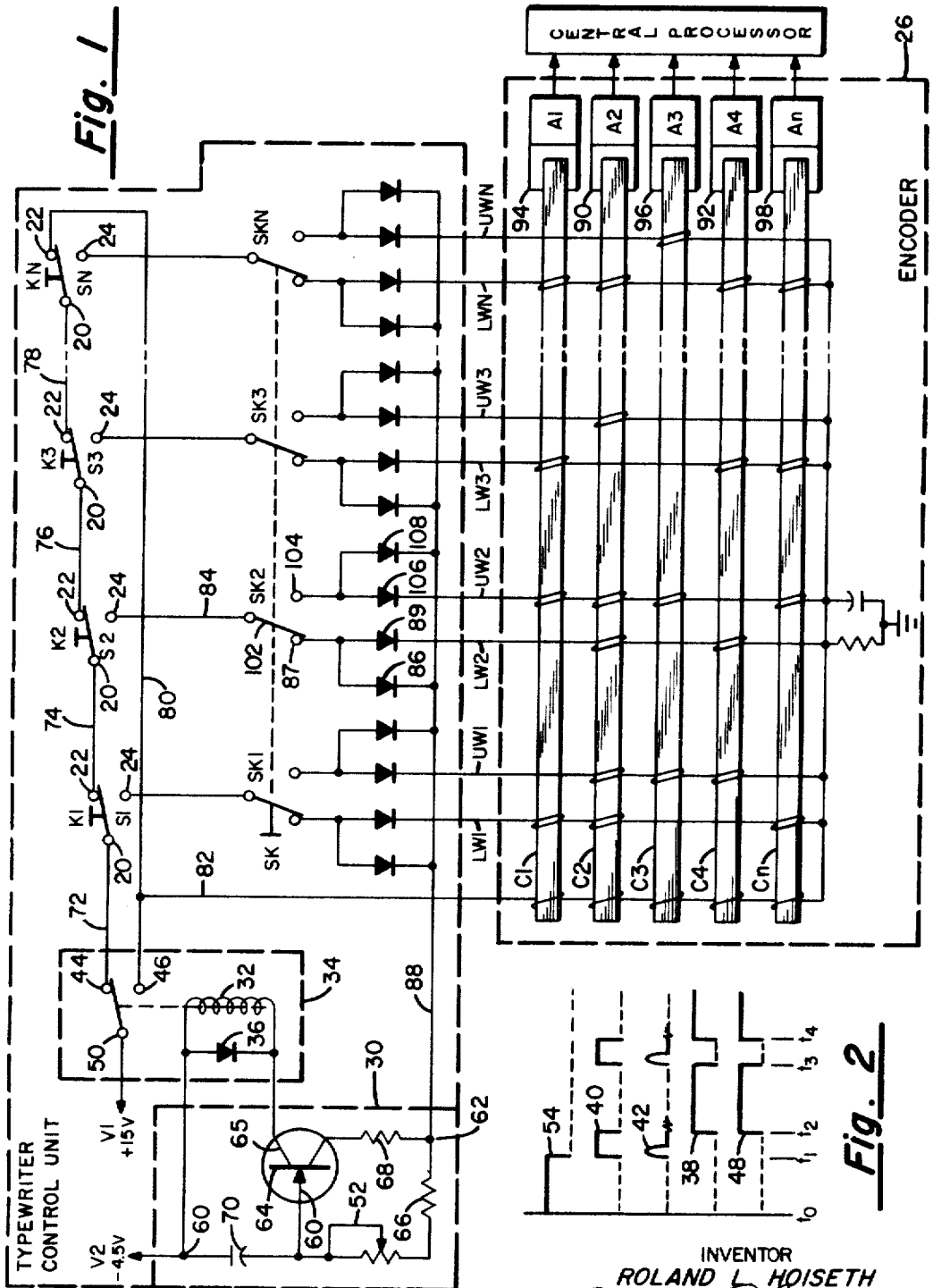

3,436,735
KEYBOARD OPERATED REPEAT CIRCUIT FOR A DATA PROCESSING SYSTEM'S OPERATOR CONTROL UNIT
Roland L. Hoiseth, Minneapolis, Minn., assignor to Sperry Rand Corporation, New York, N.Y., a corporation of Delaware
Filed Sept. 1, 1966, Ser. No. 576,678
Int. Cl. G06f 3/02
U.S. Cl. 340—172.5
10 Claims

ABSTRACT OF THE DISCLOSURE

An electro-mechanical control system in an item of peripheral equipment associated with an electronic processing system, and in particular to a repeat circuit providing repeated emission of a digital code that is representative of the function, or character, of the activated keyboard key of a typewriter control unit.

---

Conventional data processing is serial; that is, the information, or data, is gathered, stored, and then processed in batches. Until the processing run has been completed and the record file compiled, there is no way of obtaining a particular item of the information making-up the record file. However, there are many business conditions when the capability to make inquiries of a record file that is always up-to-the-minute has a considerable value. It may be important to know, for example, the number on hand of a particular item as of this minute—not the number that were on hand last week when the monthly inventory was run.

One place where such up-to-date-minute information would be of inestimable value is the making of an airline reservation or in the entering or transactions in a savings account passbook. This type of data processing operation is called real-time operation. In such business operations, having a plurality of remotely located operating points, it is necessary to provide means whereby up-to-the-minute data may be entered into or taken from the central data processing installation, or Central Processor. The preferred embodiment of the present invention has particular application to an Operator Control Unit may be located at such remotely located operation points. The separate Operator Control Unit may be connected to the Central Processor by a communication link consisting of a leased telephone line whereby an operator at a remotely located operation point may have instantaneous communication with the Central Processor. This communication link permits instantaneous access to the Central Processor's random access mass storage media to permit the entering of new data therein or to permit the making of corrections or revisions to already entered data.

A preferred embodiment of the present invention is incorporated in the Operator Control Unit having typewriter control unit input/output means associated therewith whereby the data to be entered by the operator into the Central Processor is typed out on a typewriter-type keyboard. The output of the typewriter control unit is fed to an encoder, which in the preferred embodiment is a read-only memory, which generates a unique group of digital data for each typewriter character. Each group of digital data consists of a word, with each word consisting of a plurality of bits, or binary digits, which are electrical bi-level voltage signals representative of a "1" or a "0." Information requested from the Central Processor, by the reverse process, is typed out on the typewriter control unit appearing as a conventional typewritten message. Such a system is more fully disclosed in copending application of V. J. Korkowski et al. Ser. No. 206,915, filed July 2, 1962, Patent No. 3,302,189. and assigned to the Sperry Rand Corporation as is the present application.

The typewriter control unit consists of a plurality of interrelated switches, lights, and control elements that inform the Central Processor, by coded digital data transmission over the communication link, of the type of data concerned. By affecting any one of a plurality of switch buttons, each switch button associated with a related typewriter keyboard key, the operator establishes the format of the information coupled to the Central Processor. Each depression of each typewriter key initiates, through the associated read-only memory, the emission of a multi-bit group of digital data that defines the alpha-numeric character associated with the depressed key. The present invention relates to a repeat circuit that enables, in the preferred embodiment, a read-only memory to emit repeated groups of the same data by the holding down, or depressing, of a single typewriter control unit key. The arrangement provides a pulse source of first and second and opposite polarity pulses (by the winding sense of the associated windings), designated the read and reset pulses, respectively. These pulses establish the magnetization of the saturable cores of the read-only memory into read or set states of opposite magnetic polarization in the well known manner; see the article, "A Survey of Read-Only Memories," M. H. Lewin, Proceedings—Fall Joint Computer Conference, 1965, pp. 775–787.

The output of a relaxation oscillator is coupled to the relay coil of an electrical magnetic relay which cause sets of normally-open (NO) and normally-closed (NC) contacts to be alternatively opened and closed. The normally-closed contact is coupled to the serially-coupled, normally-closed contacts of the key switches that are respectively associated with the keys of the typewriter control unit keyboard whereby the depression of any one key couples the read pulse to the associated word line of the read-only memory causing the multi-bit word associated therewith to be emitted therefrom and transmitted to the Central Processor. The normally-open contact is coupled to a set line that causes the magnetization of all the cores of the read-only memory to be established into an initial set state, in preparation for the next readout cycle, by the coupling thereto of a reset pulse. The arrangement is such that if the transmission of a character represented by an associated typewriter control unit key is wished to be repeated such key is merely depressed for the sufficient period of time that is required to transmit the number of desired repetitions; the normally-closed and normally-open sets of contacts alternatively couple a pulse to the depressed key's associated word line causing the associated multi-bit word to be emitted therefrom or couple a reset pulse to the read-only memory's set line setting the read-out memory's cores into a set condition in preparation for the coupling thereto of the next read pulse.

Accordingly, it is a primary object of the present invention to provide an improved typewriter control unit for an electronic data processing system.

It is another object of the present invention to provide a circuit providing repeated emissions of a digital code that is representative of the function or character of the activated keyboard key of a typewriter control unit.

These and other more detailed and specific objectives will be disclosed in the course of the following specification, reference being had to the accompanying drawings.

With particular reference to FIG. 1 there is illustrated a preferred embodiment of the present invention. In this illustrated embodiment only keyboard keys K1, K2, K3–K$n$ are illustrated for the purposes of clarifying the discussion of the illustrated embodiment. However, it is to be understood that any number of keyboard keys KN may be utilized; as an example, 24 keyboard keys where $N=24$. Each keyboard key K1 through KN has associated therewith a spring-loaded key switch S1 through SN having a common terminal 20 and normally-closed terminal 22 and normally-open terminal 24. Electrically intermediate keys K1–KN (and their respectively associated switches S1–SN) and their respectively associated lower and upper case word lines LW1–LWN and UW1–UWN, respectively, is a shift key SK which operates, in parallel, a plurality of shift key switches SK1–SKN; each shift key switch is associated with the like numbered key switch S1–SN. As the shift key SK and its associated shift key switches, SK1–SKN, play no part in the novelty of the particular invention to be described, the particular shift key arrangement illustrated is not to be considered a limitation thereto. Any one of any well-known shift key arrangements may be utilized therein including those of the copending patent applications of R. L. Hoiseth et al., Ser. No. 484,249, filed Oct. 1, 1965, Patent No. 3,288,261, and W. K. Robinson, Ser. No. 453,990, filed May 7, 1965, Patent No. 3,283,873, both assigned to the Sperry Rand Corporation, as is the present invention.

In the illustrated embodiment of FIG. 1 encoder 26 is illustrated as being a read-only memory comprising a plurality of saturable magnetic cores as the memory means which are coupled to a plurality of word lines, each word line coupling the magnetic cores in a unique manner representing an associated $n$-bit word; there are $n$ illustrated cores C1 through C$n$. In this arrangement there are two word lines associated with each keyboard key K1–KN whereby the shift key SK alternatively couples an associated keyboard key to an associated first or second word line representative of the lower case or upper case character associated with the associated keyboard key K1 through KN. As an example, if keyboard key K2 represents the letter $a$ or A, with shift key K in its normal position, the depression of keyboard key K2 would cause encoder 26 to emit a unique multi-bit word defining lower case $a$ while with shift key SK depressed the depression of keyboard key K2 would cause encoder 26 to emit a different unique multi-bit word representative of the upper case A. As encoder 26 is comprised of a plurality of saturable cores C1–C$n$, it is required, as is well known, to provide a means for establishing the magnetization of such cores in an initial set or reset state prior to the coupling of the read signal thereto by any one of the word lines associated with keys K1–KN. With cores C1–C$n$ in their initial set state the subsequent coupling of a read signal through the depressed key K2 would, as noted, couple signals to the associated differential amplifiers A1–A$n$, which differential amplifiers would emit therefrom a multi-bit word representative thereof. This system of operation of a read-only memory is well known in the art and no detail description need be given thereof; see J. A. Rajchman, Patent No. 2,734,182, patented Feb. 7, 1956. Although the illustrated embodiment of FIG. 1 utilizes a read-only memory comprising a plurality of memory elements in the form of magnetizable toroidal cores such is not to be construed as a limitation thereto. Applicant's invention is equally applicable to a plurality of arrangements of encoder means whereby the individual memory elements thereof may be of many forms such as multi-aperture devices of magnetizable material or integrated circuit flip-flops wherein there are required alternative set read operating cycles.

The means for operating the illustrated embodiment of FIG. 1 includes a signal generator 30 whose output signal 38 (see FIG. 2) is coupled to the coil 32 of an electromechanical relay means 34 having a diode means 36 coupled thereacross for transient suppression. Signal generator 30 couples a signal 38 of frequency F, which frequency in the preferred embodiment is a settable, variable signal of a frequency between 5 and 25 hertz (Hz.) as determined by the setting of variable resistor 52, which signal 38 causes normally-closed terminal 44 and normally-open terminal 46 of relay 34 to have signals 40 and 48 alternatively coupled thereto by the opening and closing of contact 50, which contact 50 is coupled to a voltage source V1. With particular reference to FIG. 2 there are illustrated the timing of the idealized waveforms of the signals 38, 40, 42, 48 and 54 associated with the embodiment of FIG. 1.

As stated above, the present invention is directed toward a repeat circuit that enables an encoder to emit repeated groups of the same multi-bit word by the holding down or depressing, of a single typewriter control unit keyboard key. It is to be noted that applicant's invention performs this function with a minimum number of parts and interconnecting wires and hardware while initiatng the repeat operation by only the activation of one keyboard key K1–KN. In the prior art arrangements such repeat operation was performed by the transmission of a separate repeat function code to the Central Processor. The Central Processor would store, in a buffer memory, the multi-bit word defining the depressed key character. When such repeat function code was received by the Central Processor the buffer memory would repeat the emission of the stored multi-bit word as determined by the repeat function code. The present invention obviates the use of separate control logic in the Central Processor to effectuate such repeat function.

While discussing the operation of the illustrated embodiment of FIG. 1 in detail it will be necessary to briefly discuss the operation of signal generator 30, as the operation of signal generator 30 is dependent upon the operation of the overall system. Signal generator 30 is a well-known relaxation oscillator circuit that provides the means of controlling the operation of relay 34 and thence the repetitive emission of the selected multi-bit word from encoder 26. Generator 30 has coupled thereto at node 60, voltage source V2 and, selectively, at node 62 voltage source V1. Voltage source V1 is coupled to node 62 whenever contact 50 of relay 34 contacts its normally-closed terminal 44 and a contact 20 of a key switch S1–SN contacts its normally-open terminal 24. With voltage source V1 not coupled to node 62 unijunction transistor 64 of generator 30 is established in its nonconducting mode by the reverse biasing arrangements of resistors 52, 66, 68, of capacitor 70, and of the parallel arranged coil 32 and diode 36. At this time relay 34 is not "pulled-in" and consequently, contact 50 couples voltage source V1 to normally-closed terminal 44, through the serially coupled contact 20 and normally-closed terminal 22 of switches S1–SN by means of conductors 72, 74, 76 and 78 and 80, and thence back to normally-open terminal 46 of relay 34, and to set line 82. Set line 82 is coupled to cores C1–C$n$ in such a magnetic sense as to permit the current signal from voltage source V1 to set the magnetization of cores C1–C$n$ into an initial set state. It is to be noted that at this time no word line is effected by a drive current signal through the normally-opened terminals 24 of their associated switches S1–SN; such as between times $t_0$–$t_1$ of FIG. 2.

If at this time $t_1$, any one of the keyboard keys K1–KN, say key K2, is depressed, voltage source V1 is coupled to node 62 through the following serial connections: contact 50 and normally-closed terminal 44 of relay 34; conductor 72; contact 20 and normally-closed terminal 22 of switch S1; conductor 74; contact 20 and normally-open terminal 24 of switch S2; conductor 84; diode 86; and conductor 88. This also couples voltage source V1 through diode 89 at the normally-closed terminal of switch SK2 to word line LW2, the induced current signal 40 of which switches the magnetization of the coupled cores C2 and C4 into a read state. The flux changes of such cores induce in the associated sense lines 90, 92 a significant signal 42 (see FIG. 2) that causes the associated differential amplifiers A2, A4 to emit the significant signals indicative of a stored "1." Cores C1, C3 and CN, not effected by such current signal of voltage source V1 couple no significant flux change to the sense lines 94, 96, and 98 of the associated differential amplifiers A1, A3 and AN causing such differential amplifiers A1, A3 and AN to emit no significant signal therefrom indicative of a stored "0." Thus, differential amplifiers A1–AN are caused to emit a multi-bit word, say 01010, indicative of the character, or format, of the depressed key K2. The coupling of voltage source V1 to node 62 causes capacitor 70 to charge through resistors 52 and 66 to a voltage level which, after a time delay determined by the associated circuit RC time constant to permit readout of the affected word line, forward-biases the base 65-emitter 67 junction of transistor 64. This forward bias causes transistor 64 to conduct providing a relatively high current flow through the circuit formed therewith by capacitor 70 and coil 32. Relay 34 is then "pulled-in" causing contact 50 to move from normally-closed terminal 44 to normally-open terminal 46 whereupon the voltage source V1 is removed from node 62 and is coupled to set line 82 resetting the magnetization of cores C1–Cn into their initial set state. The removal of voltage source V1 from node 62 permits the RC circuit of signal generator 30 to discharge therethrough which after a predetermined time delay permits the reverse bias circuit of signal generator 30 to again reverse bias the base 65-emitter 67 junction of transistor 64. With transistor 64 reverse-biased into non-conduction, relay 34 "drops-out" whereupon voltage source V1 is again coupled through contact 50 and normally-closed terminal 44. The operation of relay 34 continues the above described cycle, moving through its dropped-out, pulled-in, dropped-out, etc. condition as long as a key K1–KN, such as key K2, is depressed causing its associated key switch S2 contact 20 to remain in contact with its normally-open terminal 24 and causing the multi-bit word associated with its associated word line to be emitted from encoder 26 and coupled to the Central Processor.

For purposes of the present discussion of the operation of the illustrated embodiment of FIG. 1 assume that at time $t_0$ signal generator 30 is not coupling a significant signal to coil 32 of relay 34 whereby, as illustrated, contact 50 is in contact with normally-closed contact 44 and all the key switches S1–SN are in their normally-closed position. At this time voltage source V1 is coupled to contact 50 and terminal 44 of relay 34 through key switches S1–SN and to conductor 80 to set line 82—see signal 54 of FIG. 2. Signal 54 is coupled to set line 82 only when relay 34 and all key switches S1–SN are in their normal, non-active condition. Set line 82 is, as previously discussed, magnetically coupled to cores C1–Cn of encoder 26 in such a manner as to establish the magnetization of such cores in an initial set state of a first magnetic polarization. It is to be noted that differential amplifiers A1–A$n$ are of such a design as to emit only a significant signal therefrom indicative of the readout of a "1" and to emit therefrom an insignificant signal upon the readout of a "0."

Next, at time $t_1$ assume that the machine operator at the typewriter control unit wishes to transmit to the Central Processor the multi-bit word associated with the typewriter key K2. The operator depresses typewriter key K2 causing its contact 20 to come into contact with its normally-open terminal 24 whereupon voltage source V1 is removed from conductor 76, and thence conductor 82, and coupled to conductor 84. The current signal produced by voltage source V1 as described above flows through shift key SK2 to its normally-closed terminal 87 whereupon such current signal divides, flowing through the circuitry associated with diode 86 and with diode 89.

The current signal flowing through diode 89 flows down word line LW2 inducing in differential amplifiers A1–A$n$ a multi-bit word indicative of the lower case character associated with typewriter key K2. At the same time the current signal flowing through diode 86 is coupled to node 62 by means of conductor 88 whereby capacitor 70 begins to charge through the serially aligned resistors 52 and 66. After a predetermined delay time determined by the RC time constant of the charging circuit of capacitor 70, the base 65-emitter 67 junction of transistor 64 becomes forward-biased causing a large current signal to flow therethrough. This current signal flowing through coil 32 of relay 34 energizes relay 34 pulling-in relay 34 causing its contact 50 to come into contact with its normally-open terminal 46. This time is illustrated as time $t_2$ of FIG. 2.

With voltage source V1 removed from line 72 at time $t_2$ no current signal flows through the contact 20 normally-open terminal 24 of switch S2 and thence through conductor 84, diode 89 and the associated word line LW2 even though keyboard key K2 is depressed. Additionally, at time $t_2$ voltage source V1 is coupled through contact 50 and normally-open terminal 46 to set line 82 causing a current signal to flow therethrough resetting the magnetization of the associated cores in their initial set state.

With voltage source VI removed from node 62 due to the pulling-in of relay 34, capacitor 70 begins to discharge through its associated RC discharge circuit. After a predetermined time determined by the time constant of such RC circuit, illustrated as time $t_3$ of FIG. 2, transistor 64 returns to its condition of nonconduction whereupon relay 34 drops-out returning contact 50 to normally-closed terminal 44. If at any time between $t_2$ and time $t_3$ keyboard key K2 is allowed to resume its normal position wherein contact 20 returns to its normally-closed terminal 22 the circuitry of the illustrated embodiment of FIG. 1 will return to its condition as illustrated at time $t_0$ of FIG. 2. As discussed above, under these conditions no read signal is being coupled to any one of the word lines of encoder 26, and consequently, no information is being read therefrom. However, if it is desired that the multi-bit word representative of the lower-case character of typewriter key K2 is to be repeated, typewriter key K2 need merely be depressed until time $t_3$ whereupon the operation previously discussed will repeat itself as long as such key is depressed. It is to be noted, that by the depression of keyboard key K2 and the movement of contact 20 from normally-closed terminal 22 to normally-open terminal 24 all subsequent key switches S3 through SN of keys K3–KN, respectively, are deactivated whereby the depression of any one of such subsequent keys couples no signal to the associated word lines.

It is apparent from the above discussion that if the machine operator would wish to transmit the multi-bit word of the upper-case character of key K2 it would only be necessary to depress shift key SK whereupon contact 102 of shift switch SK2 would be moved from its normally-closed terminal 87 to its normally-open terminal 104 whereupon the operation would be as described above, with the read signal being coupled to word line UW2 through the associated diode 106 and to node 62 of signal generator 30 by way of conductor 88 through diode 108.

Thus, it is apparent that there has been described and illustrated therein a preferred embodiment of the present invention that provides a novel keyboard operated repeat circuit for a data processing system's typewriter control unit. It is understood that suitable modifications may be made in the structure as disclosed provided that such modifications come within the spirit of the appended claims. Having now, fully illustrated and described my invention, what I claim to be new and desire to protect by Letters Patent is set forth in the appended claims.

What is claimed is:

1. A keyboard operated repeat circuit, comprising:
   a control signal source of alternative first or second signals;
   a keyboard having a plurality of keys;

a plurality of key switches, each separately associated with an associated key;

each of said key switches having alternative first or second conditions, each condition associated with the normal or activated condition, respectively, of the associated key;

a utilization means;

a first control line for coupling said control signal source to said utilization means;

a plurality of second control lines coupled to said utilization means each second control line uniquely representing an associated unique function;

first means for serially intercoupling all of said key switches to said control signal source only when all of said key switches are in said first condition;

second means including at least part of said first means for coupling said control signal source to a selected one of said second control lines when an associated key is selectively activated causing the associated key switch to be in said second condition;

said control signal source alternatively coupling said first signal to said first control line or to said selected one of said second control lines for causing said utilization means to represent the function associated with the selectively activated key.

2. The repeat circuit of claim 1 wherein said control signal source includes an electromechanical relay driven by a relaxation oscillator.

3. The repeat circuit of claim 2 wherein said first signal is of a significant voltage level and said second signal is of an insignificant voltage level.

4. The repeat circuit of claims 3 where said utilization means includes an encoder means.

5. The repeat circuit of claim 4 wherein said second control lines are word lines.

6. The repeat circuit of claim 5 wherein said encoder means includes a plurality of memory means coupled to said word lines for uniquely representing the associated unique function as an unique multi-bit word.

7. The repeat circuit of claim 6 wherein said memory means are toroidal cores of magnetizable material having first and second conditions of substantially-saturated remanent magnetic states of opposite polarization.

8. The repeat circuit of claim 7 wherein said first control line when coupled by said first signal causes the magnetization of all of said cores to be set in said first condition.

9. The repeat circuit of claim 8 wherein said second means when coupled by said first signal causes the magnetization of the selected cores of the selected word line to be set in said second condition for causing said encoder means to emit a multi-bit word representative of the associated function.

10. A keyboard operated repeat circuit, comprising:

an electromechanical relay means having a relay coil and a set of contacts having a common contact and a normally-closed first terminal and a normally-open second terminal;

a keyboard having a plurality of manually activated keys;

a plurality of key switches, each separately associated with an associated key;

each of said key switches having a set of contacts having a common contact and a normally-closed first terminal and a normally-open second terminal, said first and second terminals associated with the normal and activated condition, respectively, of the associated key;

pulse generator means coupled to said relay means relay coil;

means for serially intercoupling said key switches between the normally-closed first terminal and the normally-open second terminal of said relay means when said key switches are in said normal condition;

an encoder means including a plurality of memory means each settable in alternative first or second conditions;

a plurality of word lines coupled to said memory means for uniquely representing an associated multi-bit word;

means for coupling said relay means normally-open second terminal to said memory means and means for separately coupling each of said key switches' normally-open second terminal to a separately associated word line through a separately associated first diode means and to said pulse generator means through a separately associated second diode means, each of said first and second diode means common-poled at their associated key switches' normally-open second terminal.

References Cited

UNITED STATES PATENTS

| 3,017,460 | 1/1962 | Alexander | 178—17 |
| 3,217,854 | 11/1965 | Bräunig | 197—19 |
| 3,289,806 | 12/1966 | Manus | 197—19 |

PAUL J. HENON, *Primary Examiner.*

PAUL R. WOODS, *Assistant Examiner.*

U.S. Cl. X.R.

197—17, 98; 340—365